United States Patent

Chiang et al.

[11] Patent Number: 5,946,005
[45] Date of Patent: Aug. 31, 1999

[54] COMPUTER GRAPHICS MEMORY ARCHITECTURE HAVING A GRAPHICS PROCESSOR AND A BUFFER

[75] Inventors: Ming-Mao Chiang, Taipei; Ruen-Rone Lee, Hsinchu; Ming-Fen Lin, Taipei, all of Taiwan

[73] Assignee: Industrial Technology Research Institute, Hsinchu, Taiwan

[21] Appl. No.: 08/920,139

[22] Filed: Aug. 27, 1997

Related U.S. Application Data

[63] Continuation-in-part of application No. 08/531,600, Sep. 21, 1995.

[51] Int. Cl.[6] .......................................................... G09G 5/36
[52] U.S. Cl. .......................... 345/509; 345/501; 345/203; 711/202
[58] Field of Search ..................................... 345/501–506, 345/521, 526, 507, 186, 188, 509, 515, 516, 203; 711/1, 5, 6, 100, 105, 147, 153, 200, 202, 203, 206, 221

[56] References Cited

U.S. PATENT DOCUMENTS

| | | | |
|---|---|---|---|
| 5,113,180 | 5/1992 | Gupta et al. | 345/515 |
| 5,251,322 | 10/1993 | Doyle et al. | 345/501 |
| 5,579,473 | 11/1996 | Schlapp et al. | 345/501 |
| 5,664,161 | 9/1997 | Fukushima et al. | 345/501 |
| 5,745,739 | 4/1998 | Wang et al. | 345/516 |
| 5,793,385 | 8/1998 | Nale | 345/515 |

*Primary Examiner*—Ulka Chauhan
*Attorney, Agent, or Firm*—Proskauer Rose LLP

[57] ABSTRACT

Disclosed is an improved computer graphics memory architecture. The architecture includes an address translation table (ATT) and a buffer. The address translation table receives information about desired pixel data and determines the physical address of the desired data. The buffer is connected to the ATT and has a dual bank which stores the color value and the Z value of a 3-D pixel. A buffer addressing method is also provided in which the address of the desired pixel information and associated control circuits may be quickly determined through an appropriate data arrangement in the buffer and an address transfer table.

5 Claims, 10 Drawing Sheets

FIG. 10

|  | 1st2M | 2nd2M | 3rd2M | 4th2M |  |
|---|---|---|---|---|---|
| Data.Bit0 | 4n + M0<br>4n+1 + M0<br>4n+2 + M0<br>4n+3 + M0 | 4n + M1<br>4n+1 + M1<br>4n+2 + M1<br>4n+3 + M1 | 4n + M2<br>4n+1 + M2<br>4n+2 + M2<br>4n+3 + M2 | 4n + M3<br>4n+1 + M3<br>4n+2 + M3<br>4n+3 + M3 | Fa |
|  | 4n+4 + M4<br>4n+5 + M4<br>4n+6 + M4<br>4n+7 + M4 | 4n+4 + M5<br>4n+5 + M5<br>4n+6 + M5<br>4n+7 + M5 | 4n+4 + M6<br>4n+5 + M6<br>4n+6 + M6<br>4n+7 + M6 | 4n+4 + M7<br>4n+5 + M7<br>4n+6 + M7<br>4n+7 + M7 | Zb |
| Data.Bit31 |  |  |  |  |  |
| Data.Bit32 | 4n+4 + M0<br>4n+5 + M0<br>4n+6 + M0<br>4n+7 + M0 | 4n+4 + M1<br>4n+5 + M1<br>4n+6 + M1<br>4n+7 + M1 | 4n+4 + M2<br>4n+5 + M2<br>4n+6 + M2<br>4n+7 + M2 | 4n+4 + M3<br>4n+5 + M3<br>4n+6 + M3<br>4n+7 + M3 | Fb |
|  | 4n + M4<br>4n+1 + M4<br>4n+2 + M4<br>4n+3 + M4 | 4n + M5<br>4n+1 + M5<br>4n+2 + M5<br>4n+3 + M5 | 4n + M6<br>4n+1 + M6<br>4n+2 + M6<br>4n+3 + M6 | 4n + M7<br>4n+1 + M7<br>4n+2 + M7<br>4n+3 + M7 | Za |
| Data.Bit63 |  |  |  |  |  |

Note: 1) n: between 0 to $(2^{17}-1)$
2) M0, M1, to M7 represents the base address; so
   M0 base address : 0 M byte
   M1 base address : 1 M byte
   M2 base address : 2 M byte
   M3 base address : 3 M byte
   M4 base address : 4 M byte
   M5 base address : 5 M byte
   M6 base address : 6 M byte
   M7 base address : 7 M byte

| Bit0 | 15 | 16 | 31 | 32 | 48 | 49 | 63 |
|---|---|---|---|---|---|---|---|
| M0 | M1 | M0 | M1 | M0 | M1 | M0 | M1 |

8M bytes

Note: M0 base address: 0~4 M bytes
M1 base address: 5~8 M bytes

FIG. 12

|  | 1st2M | 2nd2M | 3rd2M | 4th2M |  |
|---|---|---|---|---|---|
| 0 | 4n + M0<br>4n+1 + M0<br>4n+2 + M0<br>4n+3 + M0 | 4n + M1<br>4n+1 + M1<br>4n+2 + M1<br>4n+3 + M1 | 4n + M2<br>4n+1 + M2<br>4n+2 + M2<br>4n+3 + M2 | 4n + M3<br>4n+1 + M3<br>4n+2 + M3<br>4n+3 + M3 | Fa |
| 31 | 4n+4 + M4<br>4n+5 + M4  M60  M64 M65<br>4n+6 + M4<br>4n+7 + M4 | 4n+4 + M5<br>4n+5 + M5  M61  M66 M67<br>4n+6 + M5<br>4n+7 + M5 | 4n+4 + M6<br>4n+5 + M6  M62  M68 M69<br>4n+6 + M6<br>4n+7 + M6 | 4n+4 + M7<br>4n+5 + M7  M63  M70 M71<br>4n+6 + M7<br>4n+7 + M7 | Zb |
| 32 | 4n+4 + M0<br>4n+5 + M0<br>4n+6 + M0<br>4n+7 + M0 | 4n+4 + M1<br>4n+5 + M1<br>4n+6 + M1<br>4n+7 + M1 | 4n+4 + M2<br>4n+5 + M2<br>4n+6 + M2<br>4n+7 + M2 | 4n+4 + M3<br>4n+5 + M3<br>4n+6 + M3<br>4n+7 + M3 | Fb |
| 64 | 4n + M4<br>4n+1 + M4  M60  M64 M65<br>4n+2 + M4<br>4n+3 + M4 | 4n + M5<br>4n+1 + M5  M61  M66 M67<br>4n+2 + M5<br>4n+3 + M5 | 4n + M6<br>4n+1 + M6  M62  M68 M69<br>4n+2 + M6<br>4n+3 + M6 | 4n + M7<br>4n+1 + M7  M63  M70 M71<br>4n+2 + M7<br>4n+3 + M7 | Za |

Note: 1) M0, M1, to M7 and M60, M61, to M71 represent the base address; so
 M0 base address : 0 M byte   M1 base address : 1 M byte
 M2 base address : 2 M byte   M3 base address : 3 M byte
 M4 base address : 4 M byte   M5 base address : 4.5 M byte
 M6 base address : 5 M byte   M7 base address : 5.5 M byte
 M60 base address : 6~6.25 M bytes   M66 base address : 7.25~7.375 M bytes
 M61 base address : 6.25~6.5 M bytes   M67 base address : 7.375~7.5 M bytes
 M62 base address : 6.5~6.75 M bytes   M68 base address : 7.5~7.625 M bytes
 M63 base address : 6.75~7 M bytes   M69 base address : 7.625~7.75 M bytes
 M64 base address : 7~7.125 M bytes   M70 base address : 7.75~7.875 M bytes
 M65 base address : 7.125~7.25 M bytes  M71 base address : 7.875~8 M bytes

COMPUTER GRAPHICS MEMORY ARCHITECTURE HAVING A GRAPHICS PROCESSOR AND A BUFFER

RELATED APPLICATION

The present application is a continuation-in-part of U.S. patent application Ser. No. 08/531,600 filed on Sep. 21, 1995, No Patent Number entitled "Computer Graphics Memory Architecture" and assigned to the assignee herein. The contents of this patent application are incorporated herein by reference.

FIELD OF THE INVENTION

The present invention relates to graphical user interface engines for use with a computer. In particular, the present invention relates to an improved computer graphics memory architecture for use with a graphical user interface that is fast, yet uses hardware in an efficient and economical manner.

BACKGROUND OF THE INVENTION

Computer graphics applications are becoming increasingly complex. The large amount of data a computer processes when running a program having complex graphics slows down the computer. Computer graphics software cannot reduce the amount of data to be processed, and therefore cannot solve the problem of speeding up the graphics processing. Thus, some computer engineers have improved computer graphics memory architectures to improve graphics processing speed while accessing data to the graphics memory.

FIG. 1 depicts a conventional computer system 10. The computer system 10 has a processor 12 comprising of one or more CPUs, a main memory 14, a disk memory 16, and an input device 18, such as a keyboard and mouse. These devices 12–18 are connected to a bus 20 which transfers data, i.e., instructions and information, between the devices 12–18. A graphics controller 30 is also connected to the bus 20. As shown, the graphics controller 30 includes a drawing processor 32. The drawing processor 32 is also connected to an address generator 36 and a data input of a frame buffer 34 and a Z buffer 35. The address generator 36, in turn, is connected to RAS (row address select) (not shown), CAS (column address select) (not shown), and chip select inputs (not shown) of the frame buffer 34 and Z buffer 35. Illustratively, the frame and Z buffers 34, 35 are implemented with plural VRAMs (video random access memories). The frame buffer 34 is connected to a display device 38, such as a cathode ray tube (CRT) or liquid crystal display (LCD) monitor.

The drawing processor 32 receives instructions from the processor 12 for drawing objects. For instance, in the case of a computer aided design (CAD) application, the processor 12 may receive user input regarding creating and locating objects in three dimensional (3-D) space. The processor 12, in turn, transfers instructions regarding the size, location, texture, translucence, etc. of such objects to the drawing processor 32. In response, the drawing processor 32 creates a pixel image representation of a plane of view of such objects in 3-D space. The pixels of the image of each plane of view form part of a frame that is stored by the drawing processor 32 in the frame buffer 34. In 3-D graphics applications, each pixel has color data (e.g., data for the red, green, and blue values of the pixel), and so called Z-values, relating to the Z-coordinate, or depth, of a graphical image.

The pixel color data is stored in the frame buffer 34. The pixel Z-values are stored in the Z buffer 35. In two dimensional (2-D) applications, the Z-buffer 35 may be used as an additional frame buffer to hold pixel color data. Drawing processors 32 are known, such as is disclosed in U.S. Pat. Nos. 5,046,023 and 5,185,856. The latter reference discloses a drawing processor that is specifically adapted for rendering 3-D objects. The contents of these patents are incorporated herein by reference.

FIG. 2 is a block diagram of one type of known computer graphics memory architecture. The architecture comprises a drawing processor 32', a frame buffer 34, a Z buffer 35, and a data path 40. The drawing processor 32' comprises a 3-D processing unit 42' and a 2-D processing unit 44'. The 3-D processing unit has a pixel color processor C and a pixel Z-value processor Z. All of these hardware elements are well known to those skilled in the art. This hardware is disclosed, for example, in the patents discussed above.

In a 3-D application, the frame buffer 34 holds color data for a number of pixels, each pixel having 32 bits of color data. In the architecture of FIG. 2, the frame buffer 34 is 64 bits wide and is connected to a 64 line data path 40. The data path 40 can handle two pixels of color data simultaneously when data is transported from the buffers to the drawing processor or returned to the buffers after processing. The Z buffer 35 holds Z-value data for a number of pixels, each pixel having 24 bits of Z-value data. The Z buffer is 64 bits wide and is also connected to a 64 line data path 40. The 16 bit difference between the number of Z bits and the available data lines cannot be avoided because the data path 40 is 64 lines. In any event, these 16 data lines are used when the Z buffer 35 is used as an additional frame buffer during 2-D applications discussed below. Thus, the data path 40 can handle two pixels of Z-value simultaneously.

For each input or output (I/O) transaction between one of the buffers 34, 35 and the drawing processor 32', either two pixels of color or Z-value data may be retrieved from or written into the appropriate buffer. Because two pixels of either color or Z-value data are being processed at the same time, the drawing processor 32' has two copies of the color processing hardware C (this is represented in FIG. 2 by the indication 2×C) and two copies of the Z processing hardware Z (represented by 2×Z). For 3-D applications this architecture requires 64+48=112 data lines. This memory architecture uses 112 data lines, two 3-D color processors, and two 3-D Z-value processors to process two pixels of data (e.g., two pixels of color or two pixels of Z-values) per I/O transaction.

In the 2-D application, two pixels of color data may be retrieved from either the frame buffer 34 or the Z buffer 35 and brought to the 2-D processing unit 44'. Because two pixels are processed at once, the drawing processor 32' requires two copies of the 2-D color processing hardware. Thus, 64 data lines are required to process the 2-D application.

Overall, this memory architecture uses 112+64=176 total data lines to process graphics information. Although this is a very large memory architecture, it processes two pixels of color or Z-value data (e.g., 64 bits) in a single I/O transaction.

FIG. 3 is a block diagram of another type of known computer graphics memory architecture. This architecture comprises a drawing processor 32", a frame buffer 34, a Z buffer 35, and two data paths 48, 50. The drawing processor 32" comprises a 3-D processing unit 42" and a 2-D processing unit 44". The 3-D processing unit has a color processor C and a Z-value processor Z.

As in FIG. 2, this hardware is well-known to those skilled in the art. The frame buffer 34 holds 32 bit pixel color data for a number or pixels. The frame buffer 34 is 32 bits wide and is connected to a 32 bit line path 48. In a 3-D application, the 32 line data path 48 transports the color pixel data to the 3-D processor color processing unit C. The Z buffer 35 holds a number of 24 bit Z-values. The Z buffer is 24 bits wide and is connected to a 24 line data path 50, which path transports the Z-value data to and from the 3-D processor Z-value processor Z.

In this architecture, only one pixel of color or Z-value data is processed per I/O transaction. Therefore, only one copy of the 3-D color and Z-value processing hardware are used. For 3-D processing, there are 32+24=56 total data lines. This memory architecture uses 56 data lines, one 3-D color processor, and one 3-D Z-value processor to process one pixel of 3-D color or one pixel of 3-D Z-value information per I/O transaction. Although this architecture is smaller and less expensive to manufacture than the FIG. 2 architecture, it processes one pixel of color or Z-value data per I/O transaction. Thus, it processes graphic information at half the speed of the FIG. 2 architecture. The 24 bit Z buffer is not used in 2-D applications. Overall, this memory architecture uses 56+32=88 total data lines to process graphics information.

FIG. 4 is a block diagram of a computer graphics memory architecture 100 according to the invention described in related patent application Ser. No. 08/531,600 ("the '600 invention"). This preferred embodiment has a frame buffer 134, a Z buffer 135, a data path 140, and a drawing processor 132. The frame buffer 134 has two parts, a "forward" (even) part 151 and a "reverse" (odd) part 152. The Z buffer also has a "forward" (even) part 161 and a "reverse" (odd) part 162. The drawing processor 132 has a 3-D processor 142 and a 2-D processor 144. The 3-D processor 142 has a first reversing switch, such as a first multiplexer circuit, 150 connected to an input of the 3-D color processor C, and Z-value processor Z. A second reversing switch, such as a second multiplexer circuit, 154 is connected to an output of the color and Z processors. A "forward/reverse" circuit 156 activates the first and second reversing switches or multiplexer circuits 150, 154. The 2-D processor 144 has a third reversing switch, such as a third multiplexer circuit, 158 connected an input of the 2-D processor. A fourth reversing switch, such as a fourth multiplexer circuit, 160 is connected to an output of the 2-D processor. A "frame buffer/Z buffer" circuit 162 activates the third and fourth reversing switches or multiplexer circuits 158, 160.

In 3-D applications, the frame buffer 134 holds pixel color data in a buffer 134 wide enough to connect at least two pixels of data to the data path 140. In a preferred embodiment, the frame buffer is 64 bits wide. The Z buffer holds Z-value data in a buffer 135 wide enough to connect simultaneously at least two pixels of data to the data path 140, and preferably is wide enough to connect two pixels of color data to the data path 140. In a preferred embodiment, the Z buffer is 64 bits wide. Both buffers are connected to a data path 140 which transmits the data to and from the drawing processor 132. In a preferred embodiment, the data path 140 has 64 lines.

The frame buffer forward (even) part 151 holds pixel color data, which data is referred to as Ca, and connects at least one pixel of data to a first set of data path 140 lines. Preferably, the frame buffer forward (even) part 151 connects to data path 140 lines 0–31. The frame buffer second portion 152 holds pixel color data, which data is referred to as Cb, and connects at least one pixel of data to a second set of data path 140 lines. Preferably, the frame buffer reverse (odd) part 161 connects to data path 140 lines 32–63. The Z buffer forward (even) portion 161 holds 3-D Z-value data, referred to as Za, and connects at least one pixel of data to the second set of data path 140 lines. Preferably, the Z buffer forward (even) part 161 connects to data path 140 lines 32–63. The Z buffer reverse (odd) portion 162 holds 3-D Z-value data, referred to as Zb, and connects at least one pixel of data to the first set of data path 140 lines. Preferably, the Z buffer reverse (odd) part 162 connects to data path 140 lines 0–31.

In this preferred embodiment, either two 2-D pixels or one complete 3-D pixel—both color and Z-value—are processed in a single I/O transaction. Two copies of 2-D processing hardware are preferably provided, but only one copy of the 3-D color and Z-value processing hardware is preferably provided. The 2-D application uses 64 data lines; the 3-D application uses a total of 32+24=56 data lines. For the preferred embodiment of the '600 invention, a total of 64+56=120 lines are used. A table comparing the number of data lines used by the prior art architecture and a preferred embodiment of the '600 invention is set out below:

|  | FIG. 2 | FIG. 3 | '600 Invention |
| --- | --- | --- | --- |
| Lines used in 2-D | 64 | 32 | 64 |
| Lines used in 3-D | 64 + 48 = 112 | 32 + 24 = 56 | 32 + 24 = 56 |
| Total Lines | 176 | 88 | 120 |

A table comparing the processing speeds of the prior art architectures and the '600 invention are set out below:

|  | FIG. 2 | FIG. 3 | '600 Invention |
| --- | --- | --- | --- |
| 2-D processing speed | 2 pixels per I/O | 1 pixel per I/O | 2 pixels per I/O |
| 3-D processing speed | 2 color or 2 Z-values per I/O | 1 color or 1 Z-value per I/O | 1 pixel color and Z-value per I/O |

Thus, the processing speed of the '600 invention is equivalent to the speed of the architecture shown in FIG. 2. Both process 64 bits in one I/O transaction. However, this equivalent speed is performed by the '600 invention with much less hardware, and therefore is smaller and less expensive to implement. For 3-D applications, the '600 invention processes at twice the speed as the architecture shown in FIG. 3 and has the same amount of hardware.

Although the invention described in the '600 invention has many advantages over the prior art, it has several shortcomings. First, two independent buffers are provided: the frame buffer 134 and the Z buffer 135. Each of these buffers is further divided into two parts, the forward (or even) part 151, 161 and a reverse (or odd) part 152, 162. Each portion of each buffer is connected to particular bit lines of the databus. As a result, the databus arrangement and control circuits take up a relatively large area. Second, the double buffer design of the preferred embodiment uses 4 megabytes of memory. Thus, when increasing the memory size, expansion is made in 4 Mb increments. Third, a circuit board containing the preferred embodiment of the device described in the '600 invention uses two expansion slots. This uses a large amount of circuit board area and may reduce the flexibility of the device.

It is an object of the present invention to provide an improved computer graphics memory which has the many advantages of the device described in the '600 invention yet overcomes these several shortcomings.

SUMMARY OF THE INVENTION

These and other objects of the present invention are achieved by an improved computer graphics memory architecture. The architecture includes an address translation table (ATT) and a buffer. The address translation table receives information about desired pixel data and determines the physical address of the desired data. The buffer is connected to the ATT and has a dual bank which stores the color value and the Z value of a 3-D pixel. Preferably, the buffer is a single buffer for both color and Z data. A buffer addressing method is also provided in the present invention. According to a preferred embodiment of this method, the physical address of the desired pixel information and associated control circuits may be quickly determined from the virtual address through an appropriate data arrangement in the buffer and an address transfer table.

The present invention overcomes the shortcomings of other architectures. For example, the present invention may use a single buffer rather than separate, independent frame and Z buffers. Because a single buffer is used, the number of databus lines and control circuits is reduced. Also, the memory need not be in fixed increments, such as 4 Mb. Thus, the present invention is more flexible than previous architectures and methods.

BRIEF DESCRIPTION OF THE DRAWINGS

The present invention is described with reference to the following drawings:

FIGS. 10–16 illustrate preferred memory arrangements in buffers according to preferred embodiments of the present invention.

DETAILED DESCRIPTION OF A PREFERRED EMBODIMENT

Figure 5:
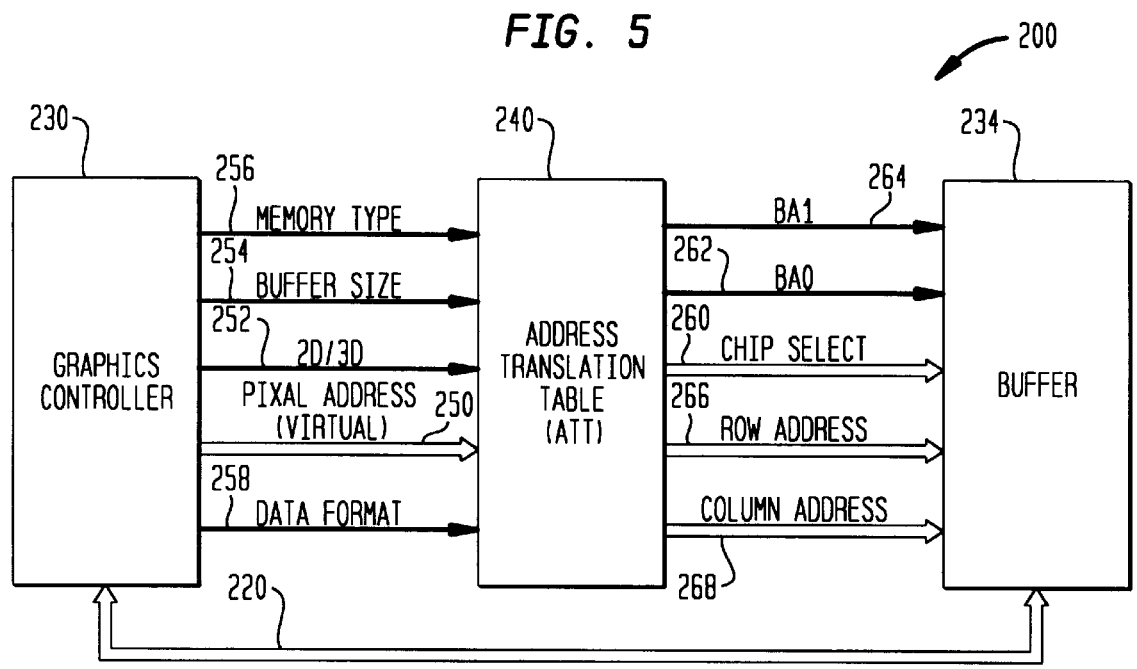
FIG. 5 is a block diagram of a computer graphics memory architecture according to a preferred embodiment of the present invention.

FIG. 5 illustrates a preferred embodiment of a graphics memory architecture 200 according to the present invention. A graphics controller 230 is connected to a buffer 234 via a databus 220. An address translation table (ATT) 240 is connected between the graphics controller 230 and the buffer 234. The ATT receives a virtual pixel address and other relevant signals from the graphics controller 230. This information is used to locale the desired physical memory addresses in the buffer 234. The pixel data is communicated between the graphics controller and the buffer via the databus 220. The buffer 234 is arranged in a manner which facilitates retrieval of storage of desired pixel data.

The graphics controller 230 transmits to the ATT 240 (1) a virtual pixel address 250 of the desired pixel information; (2) an indication whether the pixel is for a 2-D or 3-D application 252; (3) the buffer size 254; (4) the memory type 256 (e.g., the type of memory device used); and (5) the data format 258 (which indicates the ratio of the data size of the color value and the size of the Z value. Note that since the color data size and Z data size are different, the memory size, i.e., buffer size, required to maintain both data is also different). In response of these signals, the ATT 240 generates several outputs to the buffer 234. These outputs are (1) a chip selection signal (CS) 260; (2) buffer section selection lines $BA_0$, $BA_1$, 262, 264; (3) a (physical) row address 266 for the desired pixel data; and (5) a (physical) column address 268 for the pixel data. These outputs facilitate access to the correct pixel data in the buffer 234. Once accessed, the pixel data is retrieved from the buffer and sent via the databus 220 to the graphics controller 230 for processing.

Figure 6:
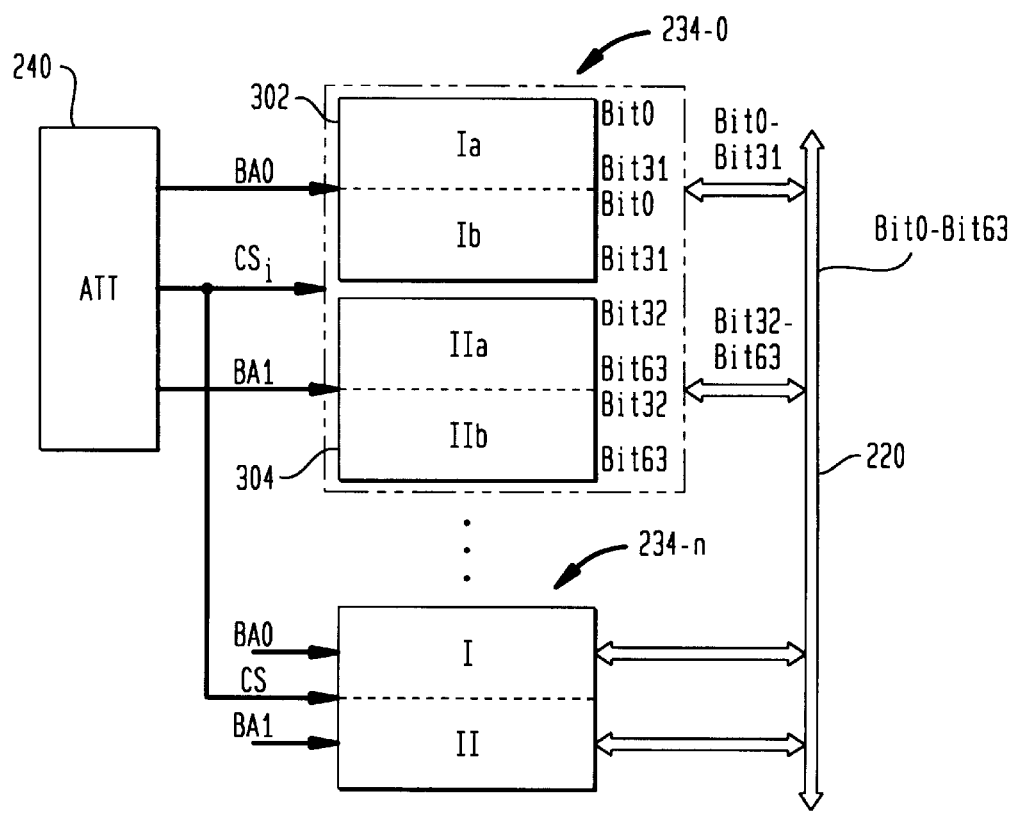
FIG. 6 is a block diagram of a first embodiment of a buffer according to the present invention.

As seen in FIG. 6, in a preferred embodiment of the present invention, the buffer 234 is preferably divided into two parts 302, 304. For true-color 3-D graphics applications, each part preferably comprises a Synchronous Graphics Random Access Memory (SGRAM), such as a 256 K×32 SGRAM or two or more Synchronous Dynamic Random Access Memory (SDRAM), such as a 1 M×16 SDRAM. The former is described below with refererce to FIG. 7; the latter is described below with reference to FIG. 8. Examples of suitable SGRAM include MT41LC256K32D from Micron, HM5283260 from Hitachi and MB81G83222 from Fujitsu. Examples of suitable SDRAM include MB811171622A from FUJITSU and TMS626162 from Texas Instruments.

As seen in FIG. 6, each access of pixel data in a first part 302 of the buffer is made through databus lines 0–31. Each access of pixel data in the second part of the buffer is made through databus lines and 32–63. With the buffer section selection control signals transmitted from the ATT 240, the data in (Ia, IIa), (Ia, IIb), (Ib, Ia), (Ib, IIb), may be selectively accessed. Note that separate color and Z buffers are not provided. This permits a single buffer structure for data bit lines 0–31 and 32–63, respectively. This reduces the number of lines and control circuits on the circuit board, thus reducing the area of the memory architecture. As seen in FIG. 6, when the buffer memory is expanded to include a plurality of buffers 234–0 to 234–n, the appropriate buffer 234–n may be selected using the chip select signal $CS_i$. The remaining lines, i.e., $BA_0$, $BA_1$, row address, and column address are shared by all buffers 234–0 to 234–n.

Figure 7:
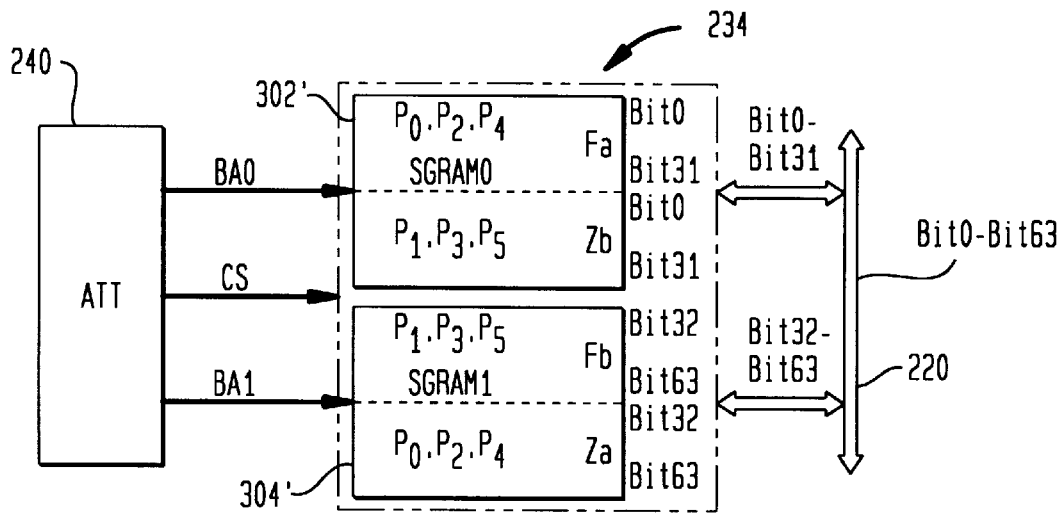
FIG. 7 is a block diagram of a second embodiment of a buffer according to the present invention.

FIG. 7 illustrates a preferred embodiment of the present invention in which the buffer uses two SGRAMs. In this preferred embodiment, the buffer contains 2 megabytes of pixel data and comprises two 256 K×32 SGRAMs. In a 3-D application, the color value of the pixel is stored in sections of SGRAM0 302' and SGRAM1 304' indicated by Fa and Fb. Accordingly, the corresponding Z values for the pixel are stored in sections indicated by Za and Zb. Thus, for example, if the graphics controller 230 desires the pixel data for the pixel stored in Fa, Za the buffer section selection control $BA_0$ may be selected in order for the pixel data to be transmitted on the bus in the following manner: color data on bus bit lines 0–31 and Z data on bus bit lines 32–63.

Alternatively, if the graphics controller desires pixel data stored in Fb, Zb, $BA_1$, may be selected. This will transmit pixel data on the bus in the following manner: Z data on bus bit lines 0–31 and color data on bus bit lines 32–63. The color and Z data may later be reversed using a reversing circuit such as a multiplexer as described above with reference to FIG. 4. In this manner, the graphics controller 230 can access a desired 3-D pixel in one of (Fa, Za) or (Zb, Fb) during one I/O action by enabling or disabling $BA_0$ or $BA_1$. Note that there is only one databus connection for each of lines 0–31 and 32–63. This is in contrast to the device in FIG. 4, which has two connections for these lines, one for the frame buffer and one for the Z buffer.

Figure 1:
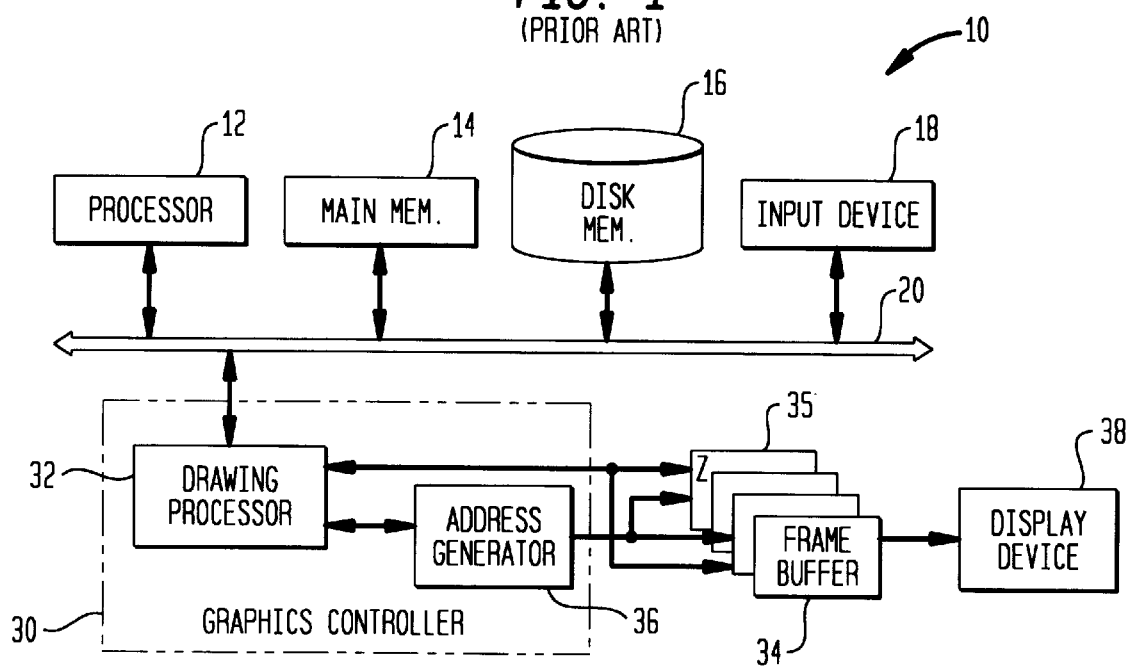
FIG. 1 is a block diagram of a conventional computer system.
Figure 2:
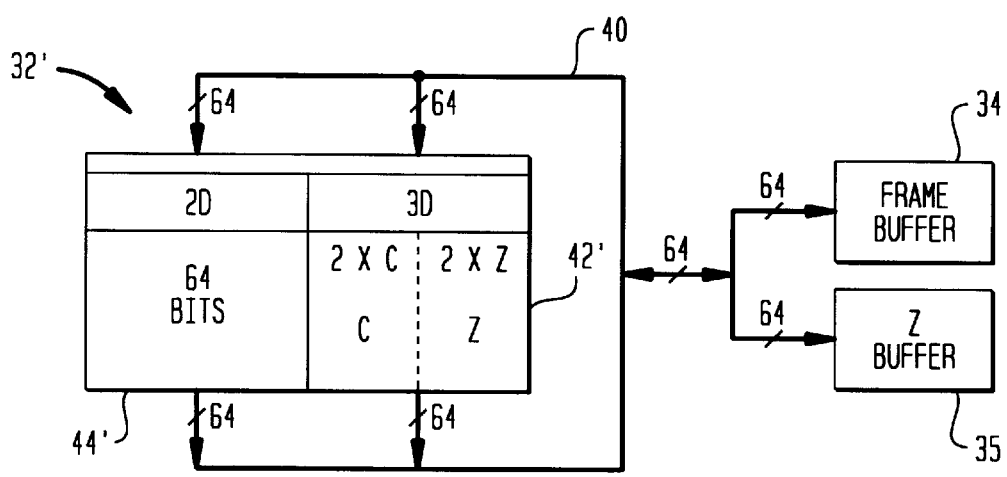
FIG. 2 is a block diagram of a first prior art computer graphics memory architecture.
Figure 3:
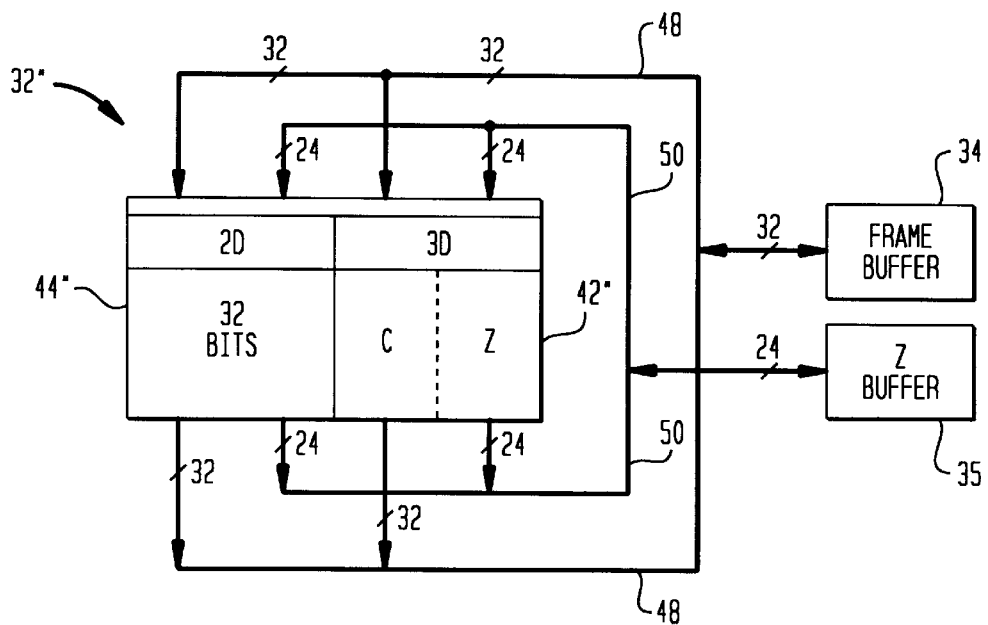
FIG. 3 is a block diagram of a second prior art computer graphics memory architecture.
Figure 4:
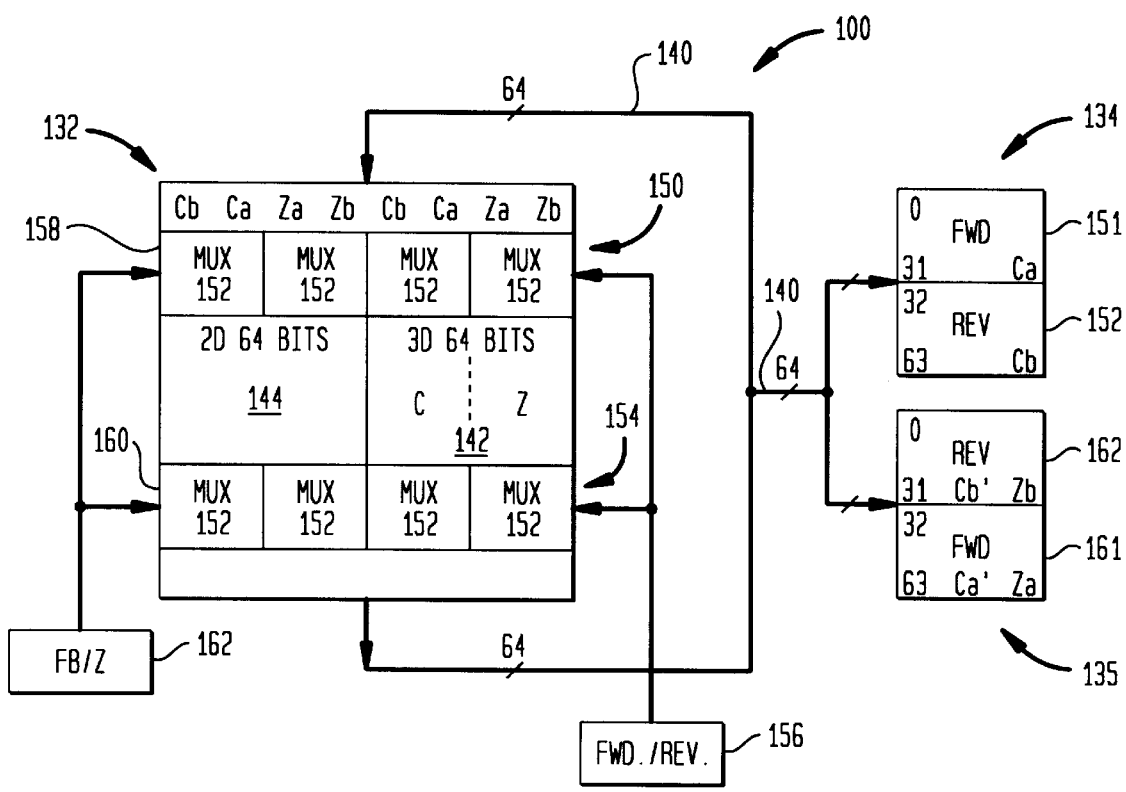
FIG. 4 is a block diagram of a computer graphics memory architecture according to a preferred embodiment of the invention described in U.S. patent application Ser. No. 08/531,600.

In a 2-D application, the graphics controller 230 may use the same method to access the color values of any two 2-D pixels in (Fa, Fb) or (Zb, Za). As seen in FIG. 7, pixel data for even numbered pixels may be found in Fa and Za; data for odd numbered pixels may be found in Fb and Zb. The efficiency demonstrated by the architecture in FIG. 4 is also achieved with the present invention; yet the present invention achieves this efficiency using fewer databus lines and associated circuits.

Figure 8:
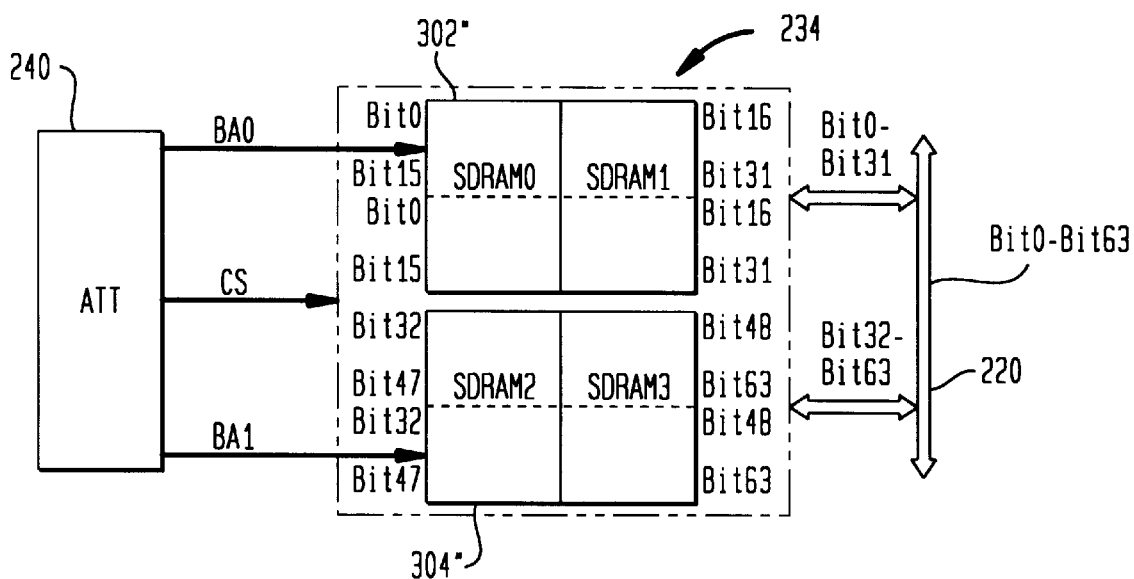
FIG. 8 is a block diagram of a third embodiment of a buffer according to the present invention.

FIG. 8 illustrates a preferred embodiment of the present invention in which the buffer 234 comprises a plurality of SDRAMs. In this preferred embodiment, the buffer 234 comprises two parts 302", 304". Each part comprises two 1 M×16 SDRAMs, which is sufficient where both the color value and the Z value of a 3-D pixel are 32 bits in width. The main difference between the embodiments of FIGS. 7 and 8 is that the SDRAMs are 16 bit, wide, rather than 32 bits wide. Thus, a BA selection will select the appropriate portion of both SDRAMs having the desired information. Thus graphic functions and access efficiency are identical to that of the embodiment of FIG. 7.

Figure 9:
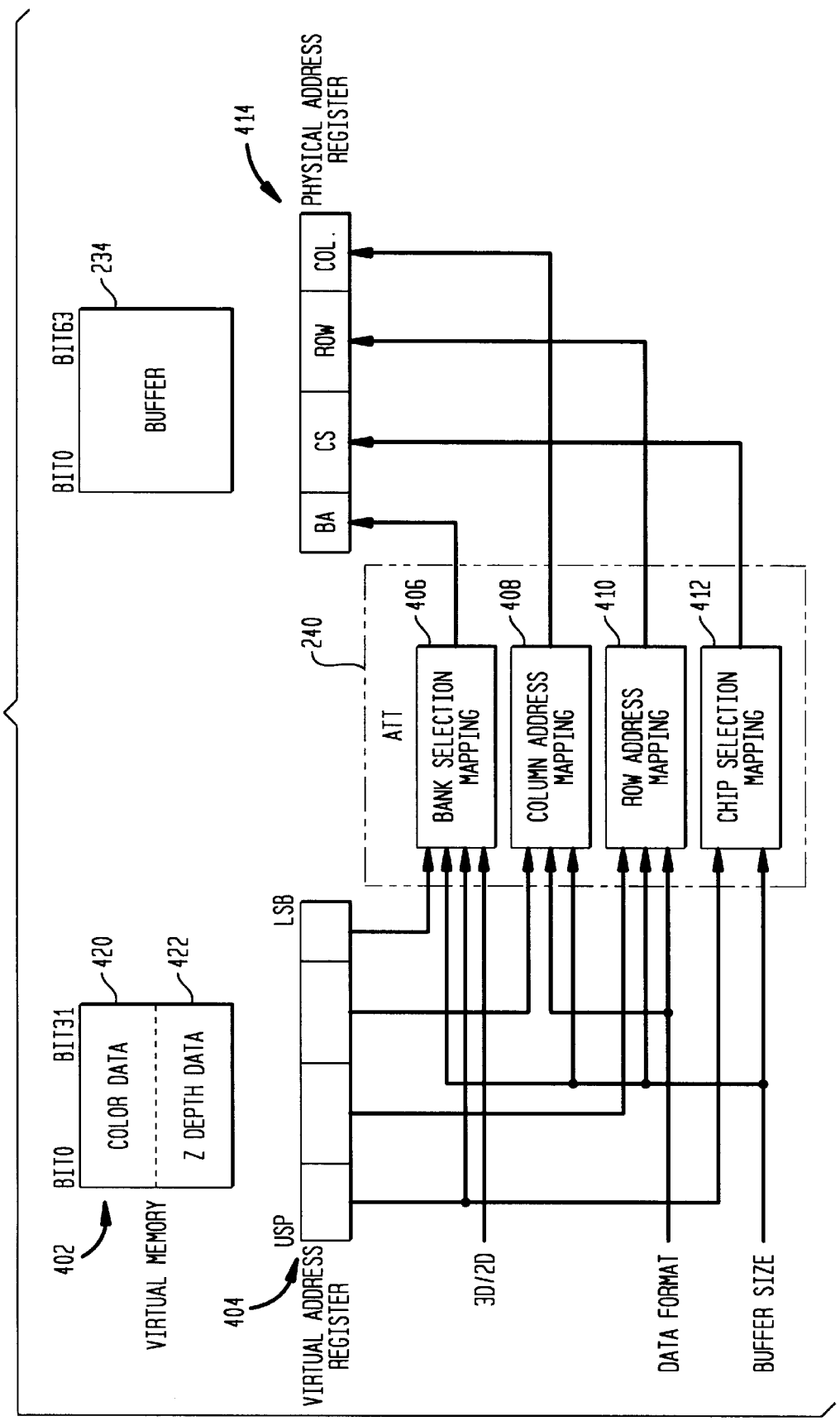
FIG. 9 is a block diagram of an address translation table according to a preferred embodiment of the present invention.

In order to apply the inventive buffer 234 effectively, the present invention preferably provides a novel addressing method performed by the ATT 240. As seen in FIG. 9, a virtual memory 402 in the graphics controller, provides a virtual address to the ATT 240. The ATT 240 includes a virtual address register 404, a buffer section selection table 406, a row address table 408, a column address table 410, a chip selection table 412, and a physical address register 414. The ATT 240 provides ordering of pixel data and facilitates determining pixel addresses and control signals in a fast and simple way.

This addressing method depends on four factors:
1) the size of the buffer;
2) the type of the memory; such as whether it is an SGRAM, SDRAM, or other;
3) the format of the data: such as whether the width of the color value is the same as the width of the Z value; and
4) the application situation: whether it is 3-D or 2-D.

When the graphics controller desires data for a particular pixel, it issues a virtual address for that pixel from virtual memory 402. The virtual memory 402 includes separate color data 420 and Z data 422 address storage areas. These separate storage areas 420, 422 have a continuous address range. There are two separate memory spaces for storing the color data and the depth data Z, in virtual memory. In some applications, the data sizes required for color and Z data may be different (i.e., different data format), and thus, the virtual memory sizes, as well as the physical buffer sizes for both the color and Z data, are different. For example, if a 3-D application uses 32-bit color data and 16-bit Z data to represent each 3-D pixel, then only half of the memory size for the color data is used by the Z data. Also, only color or Z data may be accessed by the graphics controller for certain conditions. To simplify the hardware complexity of the ATT 240 and to fit the requirement described above, a data ordering method is preferable for the graphics controller to access the desired data. The ATT 240 uses the virtual address and the four factors described above to determine the physical address of the desired pixel data. The address translation is performed in the following manner:

Buffer Selection ($BA_0$, $BA_1$): The buffer section selection table 406 receives the virtual address, the buffer size signal and data format (including the 3-D/2-D signal from the graphics controller). These bit values determine whether the application is 3-D or 2-D, whether the desired data is for an even or odd pixel, or whether the data size of color and Z is the same. Accordingly, the proper combination of data in buffer section Fa, Fb, Za, and Zb can be accessed.

Column Address: The column address table 410 receives the lower bits in the virtual address, the buffer size signal, the memory type signal and the data format of the color and Z data from the graphics controller 230 to determine the physical column address of the desired pixel data. In these bit values, the buffer size signal and memory type determine the particular bits of virtual address to be used for addressing.

Row Address: The row address table 408 receives the middle part of the virtual address, the buffer size signal, the memory type signal and the data format of the color and Z data from the graphics controller 230 to determine the physical row address of the desired pixel data. In these bit values, the buffer size signal determines the particular bits of virtual address to be used for addressing.

Chip Select ($CS_i$): The chip selection table 412 receives the higher bits of virtual address, the buffer size signal, memory type signal and the data format signal from the graphics controller 230 to determine which buffer chip is activated. FIG. 10 illustrates a buffer 234 constructed using an 8 megabyte SGRAM. If both the color value and the Z value of a pixel are 32 bits wide, the color value and the Z value each use 4 megabytes for a 3-D graphic application. As seen in FIG. 10, the first 0–3 megabytes store the color values in sequence in the Fa and Fb sections of the buffers. Note that data having the base values M0–M3 are found in Fa and Fb. The next 4–7 megabytes store the corresponding Z values in the Za and Zb sections of the buffers. Note that data having the base addresses M4–M7 are found in Za and Zb. In this example, a 21 bit virtual address determines the color value and the Z value of each pixel. For a 256 k×32 SGRAM, each section will be of the size of 512 columns× 256 rows×2 banks. Thus, according to the address translation manner described above, the physical column address comprises the 1st–8th bits of virtual address received by column address table 410. Further, physical row address is the 9th–17th bits of virtual address received by row address table 408. The buffer chip select signals $CS_i$ are thus determined by the 18th and 19th bits of virtual address received by the chip selection table 412. In addition, the buffer section selection table 406 determines the $BA_0$, and $BA_1$, by receiving the 0th, 18th, 19th and 20th bits of virtual address, as well as the 3-D/2-D signal with reference to FIG. 9.

Alternatively, if 1 M×16 SDRAM are used to construct an 8 megabyte buffer 234, the data can be arranged in the manner shown in FIG. 11. An ATT can be configured to translate the virtual address received from the graphics controller 230 to the physical address of the pixel data stored in the buffer 234 illustrated in FIG. 11. One difference between FIGS. 10 and 11 is that the 0 and 20th bits of the virtual address determine the sections ($BA_0$, $BA_1$) and the 9th–19th bits determine the row address.

The present invention can also apply to the situation when the size, of the memory used by the color value is different from the size of the memory used for the Z value. In an example of a full color 1280×1024 picture, if the color value is 32 bits and the Z value is 16 bits, then 5 megabytes of space store the color value and another 2.5 megabytes store the Z value. If an 8 megabyte SGRAM buffer is used, the data is arranged in the manner shown in FIG. 12. As seen in FIG. 12, the color values in Fa and Fb are stored in the same manner as seen in FIG. 10. The Z values in Za and Zb are stored with additional blocks for data having base values M60–M63, and smaller blocks for data having base values M64–M71.

Figure 13:
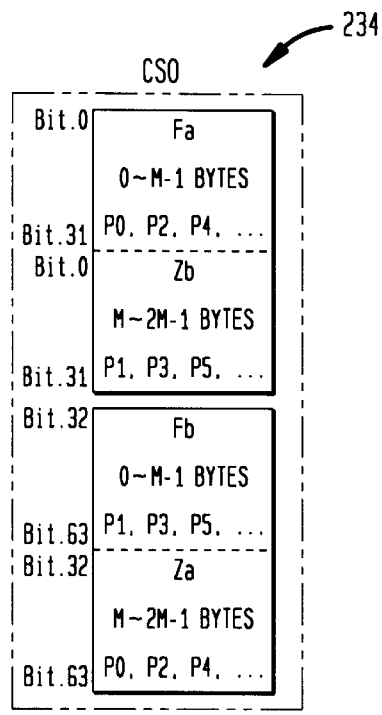
Figure 14:
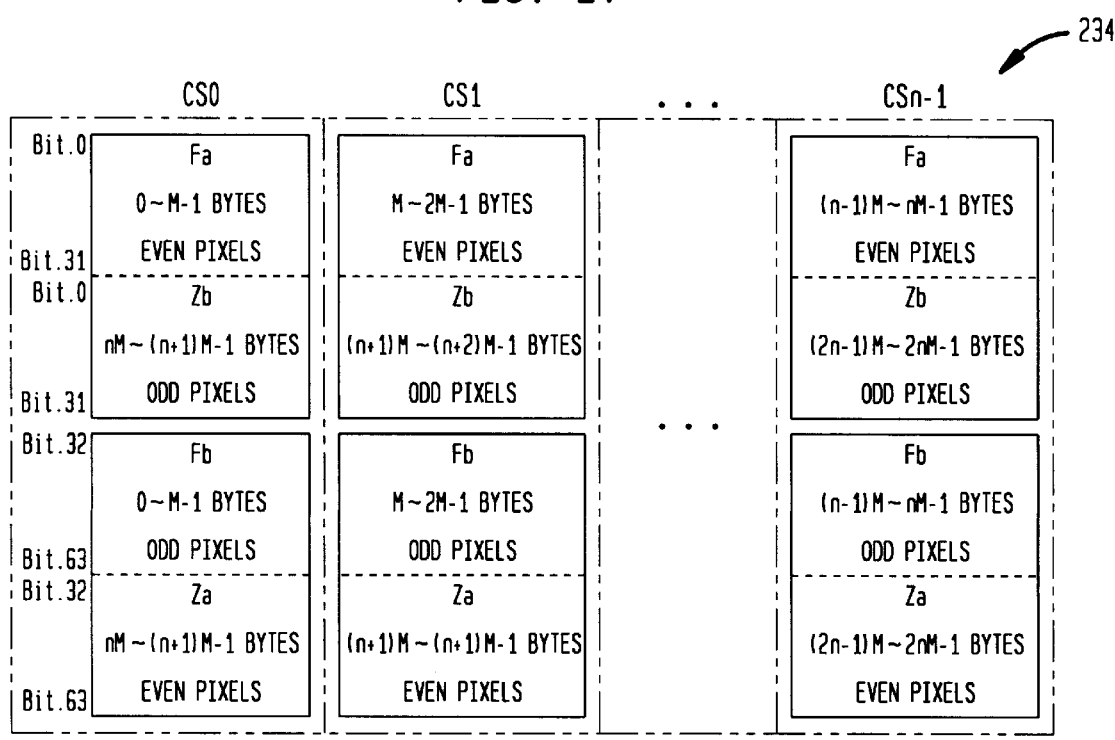
Figure 15:
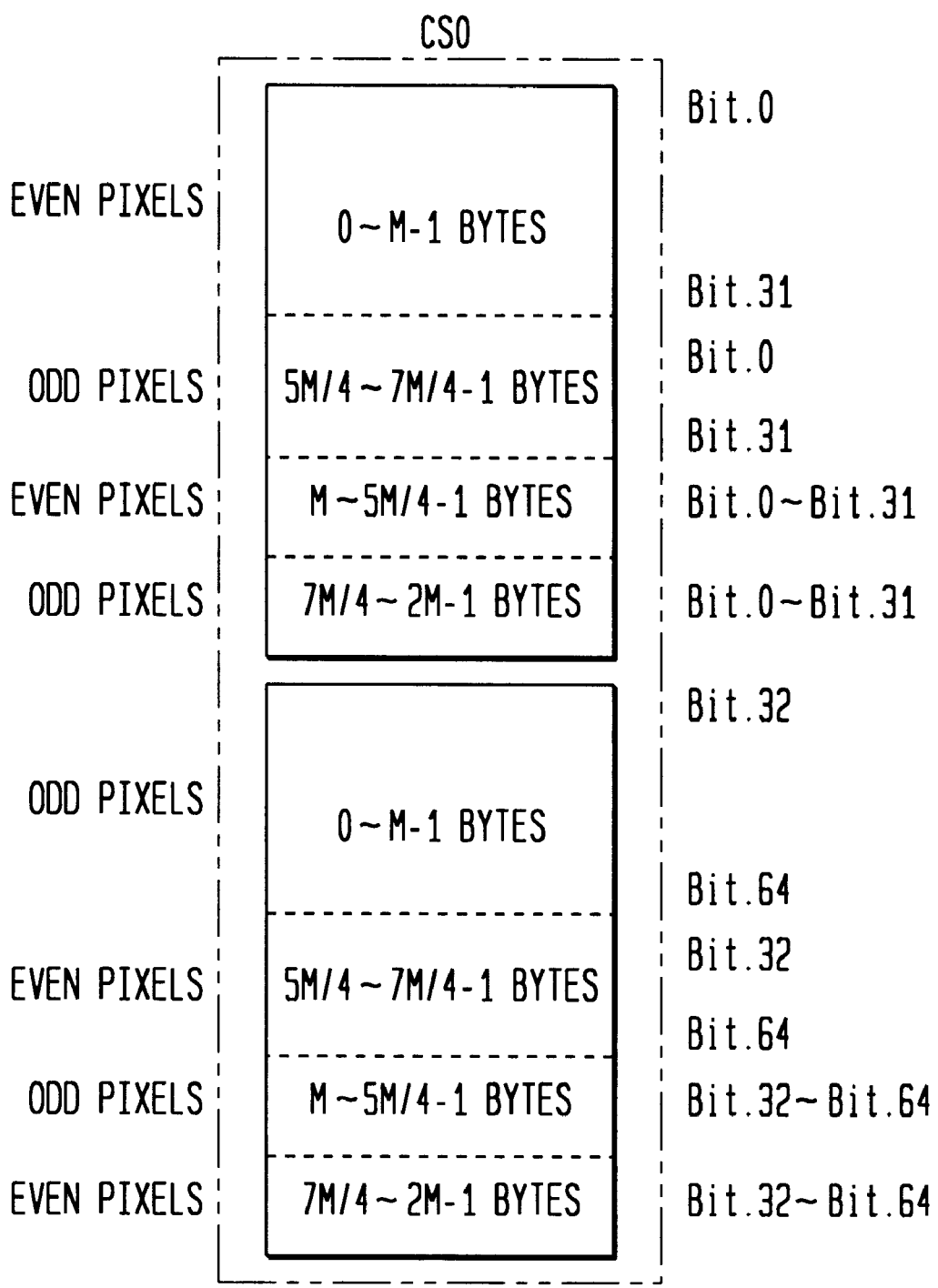
Figure 16:
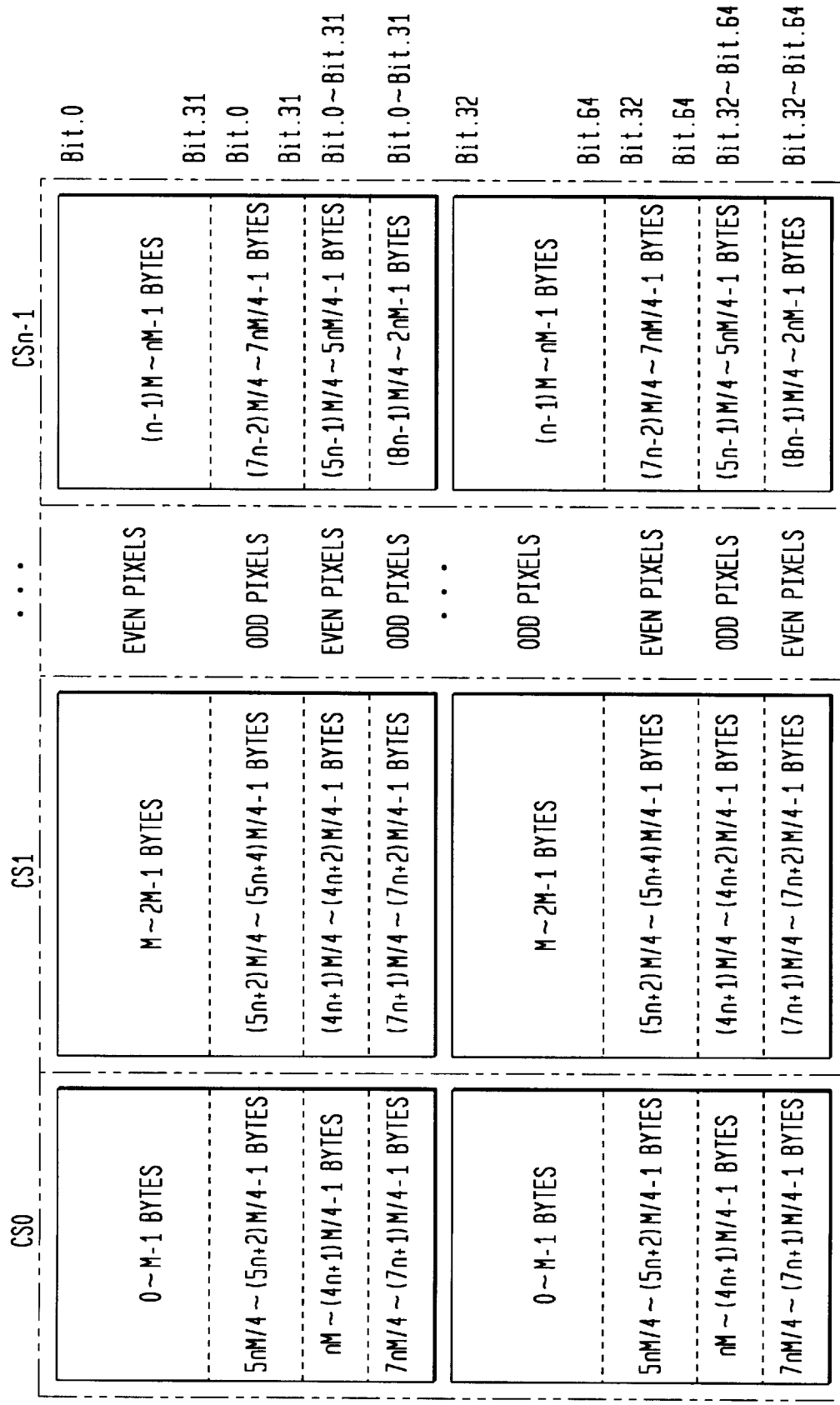

From the examples in FIGS. 10–12, a general rule may be formulated for arranging the data as follows:

In a buffer, if the size of each section is assumed to be M/2 bytes then:

(1) if the size of the memory unit used by the color value and by the Z value is the same and only one buffer is used, the data may be arranged in the manner shown in FIG. 13;

(2) if the size of the memory unit required by the color value and by the Z value is the same and n number of buffers are used, then the data may be arranged in the manner shown in FIG. 14;

(3) if the size of the memory unit required by the color value and by the Z value has a ratio of 2:1, then the data may be arranged in the manner shown in FIG. 15 when there is one buffer; and in the manner shown in FIG. 16 when there are a plurality of buffers;

(4) if the color value and the Z value have a ratio of 1:2, the data may be arranged is in the same manners as in FIGS. 15 and FIG. 16 except that the spaces for storing the color value and the Z value are reversed.

Disclosed is an improved computer graphics memory architecture. The disclosed invention includes an improved architecture which includes an address translation table and a uniquely arranged buffer to overcome the shortcomings of other architectures. Also disclosed is a unique method of storing pixel data in the buffer to facilitate access to the data The described method and device overcome the shortcomings of other architectures. For example, the present invention may use a single buffer rather than separate, independent frame and Z buffers. Because a single buffer is used, the number of databus lines and control circuits is reduced. Also, the memory need not be in fixed increments, such as 4 Mb. Thus, the present invention is more flexible than previous architectures and methods.

The present invention is not limited to the disclosed embodiment, but rather various modifications, substitutions, structures, and methods may be used to without departing from the scope of the present invention. For example, specific numbers of bits and data lines are used to describe an illustrative embodiment. A person skilled in the art readily recognizes that the invention may be used with different bit and line numbers, according to the needs of an application.

We claim:

1. A computer graphics memory architecture having a graphics processor, the architecture comprising:

a. an address translation table configured to receive a virtual address of desired pixel information from the graphics processor and to output a physical address of the desired pixel information;

b. a buffer for storing the desired pixel information and responsive to the address translation table to retrieve the desired pixel information, said buffer comprising:

(1) a first portion connected to first number of databus lines, the first portion configured to store color data and Z data said first portion including first and second section, wherein said first and second sections are configured to store one of a first or second half of color data of pixel in a 2-D or 3-D computer graphics application, and (2) a second portion connected to a second number of databus lines, the second portion configured to store color data and Z data, said second portion including third and fourth sections, wherein said third and fourth sections are configured to store one of a first or second half of color data of a pixel in a 2-D or 3-D computer graphic application; and c. a databus connected between the buffer and the graphics processor and configured to transmit the desired pixel data between the buffer and the graphics processor.

2. The computer graphics architecture of claim 1, wherein the desired pixel information includes color data and Z data.

3. The computer graphics architecture of claim 2, wherein the databus comprises a plurality of lines and each line is connected only once to the buffer.

4. A buffer for storing computer graphics pixel data, comprising:

a. a first portion connected to a first number of databus lines, the first portion being divided into a first section and a second section, wherein:

(1) the first section is configured to store one of:

(a) a first half of color data of a pixel in a 3-D computer graphics application, and (b) a first half of color data of a pixel in a 2-D computer graphics application; and (2) the second section is configured to store one of:

(a) a second half of Z data of a pixel in a 3-D computer graphics application, and (b) a second half of color data of a pixel in a 2-D computer graphics application; and b. a second portion connected to a second number of databus lines, the second portion being divided into a third section and a fourth section, wherein:

(1) the third section is configured to store one of:

(a) a second half of color data of a pixel in a 3-D computer graphics application, and (b) a first half of color data of a pixel in a 2-D computer graphics application; and (2) the fourth section is configured to store one of:

(a) a first half of Z data of a pixel in a 3-D computer graphics application, and (b) a second half of color data of a pixel in a 2-D computer graphics application.

5. A method for storing computer graphics data in a computer, the method comprising the steps of:

a. dividing a buffer into a first portion and a second portion;

b. connecting the first portion of a buffer connected to a first number of databus lines, and dividing the first portion into a first section and a second section, wherein:

(1) storing in the first section one of:

(a) a first half of color data of a pixel in a 3-D computer graphics application, and (b) a first half of color data of a pixel in a 2-D computer graphics application; and
(2) storing in the second section one of:
(a) a second half of Z data of a pixel in a 3-D computer graphics application, and
(b) a second half of color data of a pixel in a 2-D computer graphics application; and
c. connecting the second portion to a second number of databus lines, and dividing the second into a third section and a fourth section, wherein:
(1) storing in the third section one of:
(a) a second half of color data of a pixel in a 3-D computer graphics application, and
(b) a first half of color data of a pixel in a 2-D computer graphics application; and
(2) storing in the fourth section one of:
(a) a first half of Z data of a pixel in a 3-D computer graphics application, and
(b) a second half of color data of a pixel in a 2-D computer graphics application.

\* \* \* \* \*